United States Patent
Reich et al.

[11] Patent Number: 6,001,245
[45] Date of Patent: Dec. 14, 1999

[54] SEPARATING SOLID PARTICLES FROM USED LUBRICANT COMPOSITIONS

[75] Inventors: Ronald A. Reich, Allison Park; Thomas J. Kasun, Export; Raymond J. Colbert, Oakmont, all of Pa.

[73] Assignee: Aluminum Company of America, Pittsburgh, Pa.

[21] Appl. No.: 09/063,096

[22] Filed: Apr. 20, 1998

[51] Int. Cl.$^6$ .......................... B01D 35/28; B01D 11/00
[52] U.S. Cl. .......................... 210/168; 210/634; 210/773; 210/774; 210/808; 210/184; 554/11; 184/6.24
[58] Field of Search ........................... 210/168, 184, 210/634, 773, 774, 808; 554/11; 184/6.24

[56] References Cited

U.S. PATENT DOCUMENTS

| | | |
|---|---|---|
| 4,061,566 | 12/1977 | Modell . |
| 4,104,163 | 8/1978 | Grutsch . |
| 4,124,528 | 11/1978 | Modell . |
| 4,147,624 | 4/1979 | Modell . |
| 4,448,669 | 5/1984 | Scinta . |
| 4,466,923 | 8/1984 | Friedrich . |
| 4,547,292 | 10/1985 | Zarohy . |
| 4,741,806 | 5/1988 | Scinta . |
| 4,898,673 | 2/1990 | Rice et al. . |
| 5,135,655 | 8/1992 | Cimino et al. . |
| 5,290,959 | 3/1994 | Rice . |
| 5,522,995 | 6/1996 | Cockrem . |
| 5,571,403 | 11/1996 | Scott et al. . |

FOREIGN PATENT DOCUMENTS 53-119781  10/1978  Japan .

*Primary Examiner*—Thomas M. Lithgow
*Attorney, Agent, or Firm*—Glenn E. Klepac

[57] ABSTRACT

A process for separating oil from a lubricant composition containing solid particles. The contaminated lubricant composition is mixed with liquid or supercritical $CO_2$ before the lubricant composition and $CO_2$ mixture is filtered through a filter medium. The $CO_2$ is then evaporated, leaving an oil residue. Mixing the lubricant composition with $CO_2$ before filtration prevents the filter medium from being blinded by solid particles.

9 Claims, 1 Drawing Sheet

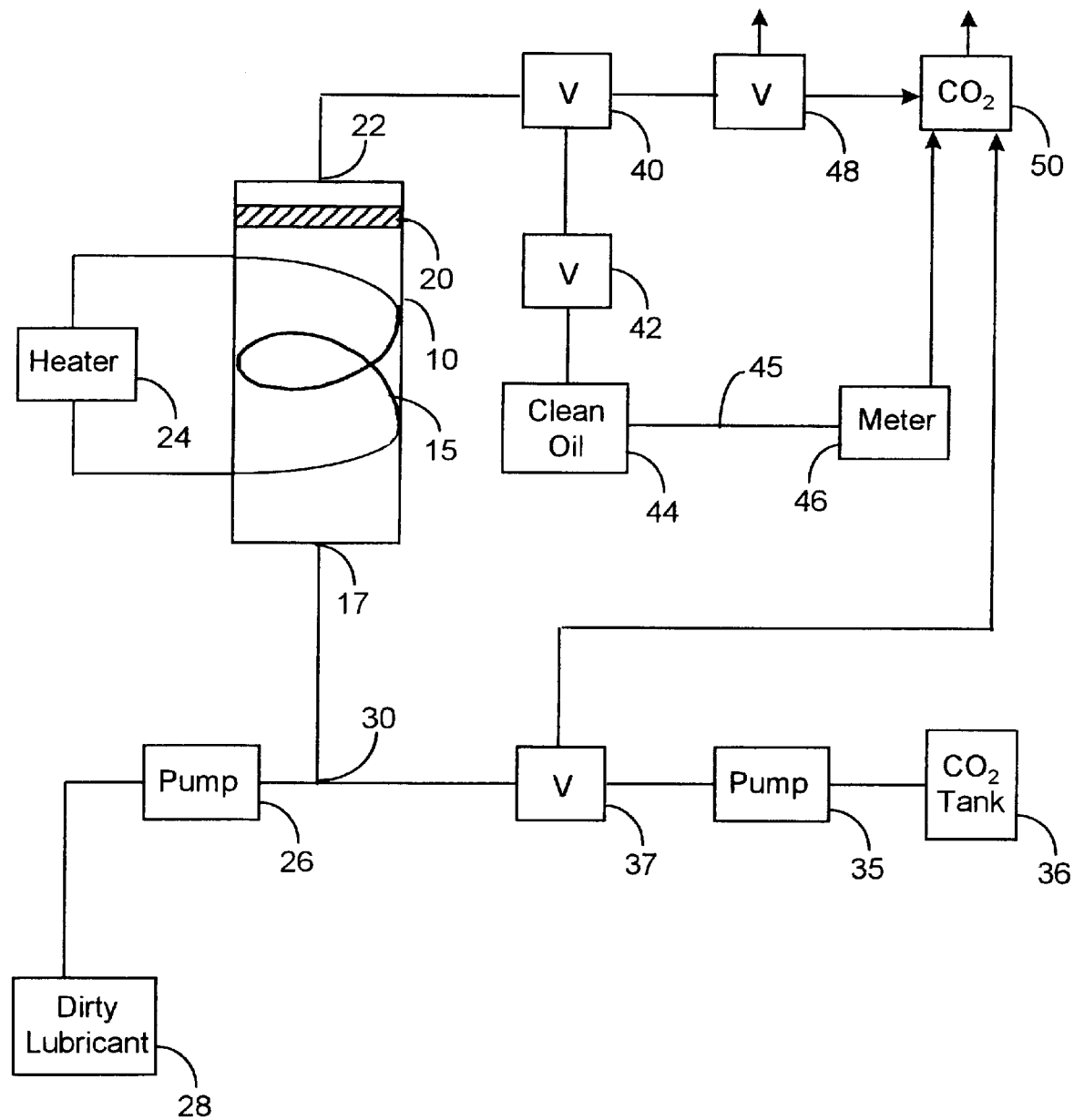

SEPARATING SOLID PARTICLES FROM USED LUBRICANT COMPOSITIONS

FIELD OF THE INVENTION

The present invention relates to a process for separating solid particles from used rolling oil.

BACKGROUND OF THE INVENTION

Metalworking lubricant compositions are widely used in the steel and aluminum industries for reducing the thickness of sheet metal in rolling mills. The lubricant compositions are typically mineral oil or synthetic oil combined with various additives. Alternatively, they may be emulsions wherein a small quantity of oil is mixed with a larger volume of water. The compositions lubricate interfaces between rolls and sheet metal, and they cool the metal as it passes between sets of opposed rolls. After prolonged use, the lubricant compositions become contaminated with finely divided metal particles, metal oxide particles and other extraneous matter such as dirt. These contaminants decrease process efficiency, increase viscosity, reduce the activity of oil as a lubricant, and eventually cause smudging and other surface defects in the product.

When the lubricant composition is contaminated, its usefulness is reduced because the solid particulate contaminants furnish an undesired abrasive and because the particles increase viscosity of the oil phase. Accordingly, it is desirable to remove the solid particles so that oil in the composition can be reused.

In both ferrous and non-ferrous metalworking operations, filtration systems are customarily established for reclaiming hydrocarbon oils from used lubricants. In these systems, the oil is separated from water, if required, and then the oil is filtered through a particulate filter medium. Diatomaceous earth particles having an average size in the range of about 1–30 microns are widely used. Diatomaceous earth filtration prolongs the life of the filter cycle by preventing the filter cake from being blinded quickly by small particulates in the oil.

In the prior art, used diatomaceous earth was typically discarded after being used to filter lubricant oils. However, the discarded diatomaceous earth poses a potential environmental hazard because of its residual oil content. Accordingly, there is a need for a process capable of reclaiming residual oil from used lubricant compositions, without discarding a large volume of oil together with the filter medium.

Lubricant compositions employed in aluminum rolling mills generally contain mineral or synthetic oil together with various oil additives. These additives are generally organic compounds such as carboxylic acids, alcohols, and esters. One important feature of the present invention is that the process described herein recovers oil additives together with mineral oil or synthetic oil.

A principal objective of our invention is to provide an economical process for removing solid particles from lubricant compositions.

A related objective of our invention is to provide a process for removing solid particles from lubricant compositions without adding any organic solvents such as benzene, toluene, methanol and tetrahydrofuran. These solvents pose serious health risks to persons inhaling or ingesting them, and they are potentially hazardous to the environment.

Additional objectives and advantages of our invention will become apparent to persons skilled in the art from the following detailed description.

SUMMARY OF THE INVENTION

In accordance with the present invention, we provide a process for separating oil from a lubricant composition contaminated by solid particles. The process is particularly useful for separating solid particles from used rolling oil. The solid particles include finely divided metal particles, metal oxide particles and other solid matter such as dirt.

The lubricant composition may contain mineral oil or synthetic oil, together with oil additives. Some useful oil additives include carboxylic acids, esters, and alcohols. The carboxylic acids are $C_8$–$C_{40}$ mono- or dicarboxylic acids. Oleic acid, isostearic acid, and lauric acid are suitable monocarboxylic acids, and dimerized linoleic acid is a suitable dicarboxylic acid. The esters may be made by combining $C_8$–$C_{40}$ mono- or dicarboxylic acids with $C_1$–$C_{18}$ alcohols and preferably $C_1$–$C_4$ alkyl alcohols. One example is methyl laurate. The alcohols are preferably $C_{10}$–$C_{20}$ alkyl alcohols. One example is lauryl alcohol.

The lubricant composition is mixed with liquid or supercritical $CO_2$ in a mixing vessel. The volume of $CO_2$ is greater than the volume of the lubricant composition. Preferably, the volume of $CO_2$ supplied to the mixing vessel is at least 30 times the volume of the lubricant composition, more preferably at least 40 times. The volume of $CO_2$ will generally be about 50–100 times the lubricant composition volume, for best results.

The mixing vessel is maintained at a temperature greater than about 20° C. and a pressure greater than about 3000 psi. More preferably, the temperature is greater than about 30° C. and the pressure is greater than about 4000 psi. Optimally, the temperature is about 40° C. and the pressure is about 4500 psi. At that temperature and pressure, $CO_2$ is a supercritical fluid and the solubility of oil in that fluid is about 1.65wt. %.

Mixing the lubricant composition with $CO_2$ results in a mixture comprising solid particles and a solution comprising oil dissolved in the $CO_2$. The solution is filtered through a filter medium that may be paper, diatomaceous earth, sand, textile fibers, or wood pulp. Paper is particularly preferred. The paper filter medium removes practically all of the solid particles. The filter medium is not quickly blinded by a buildup of fines because the $CO_2$ solution easily passes through and around the fines, unlike filtration of the undiluted lubricant composition.

The filtered solution is transferred through an expansion valve to an evaporator having a pressure greater than atmospheric pressure and less than about 1000 psi. The evaporator is heated to maintain a temperature of about 20–60° C., preferably about 20–40° C. and more preferably about 20–30° C. A particularly preferred evaporator temperature is about 25° C. with a pressure of about 500–1000 psi.

In the evaporator, $CO_2$ gas is liberated and removed. The liberated $CO_2$ gas is removed and then condensed, cooled and compressed to form liquid $CO_2$. The liquid $CO_2$ may be heated before it is recycled to the mixing vessel to dilute another batch of the lubricant composition.

BRIEF DESCRIPTION OF THE DRAWING

The sole FIGURE is a schematic illustration of an apparatus for carrying out the process of the present invention.

DETAILED DESCRIPTION OF PREFERRED EMBODIMENTS

In accordance with the present invention, there is provided a pressurized mixing vessel or extractor 10. Heating coils or heating means 15 inside the extractor 10 heat a mixture of oil and $CO_2$ entering through an entrance 17. A polytetrafluorethylene cloth filter 20 is supported near an exit or exit opening 22. An electric heater or other heat source 24 heats steam or other fluid medium flowing through the coils 15. Heating is controlled by thermocouples (not shown) inside the extractor, connected to the heater 24.

An oil pump 26 pumps a dirty lubricant composition from a reservoir 28 to a "T" fitting 30 at the base of the extractor 10. A $CO_2$ pump 35 pumps liquid or supercritical $CO_2$ from a $CO_2$ tank 36, through a pressure valve 37, and into the "T" fitting 30. Mixing of the $CO_2$ and lubricant streams begins in the "T" fitting 30 and continues in the extractor 10. The lubricant composition dissolves in the $CO_2$, producing a solution. The $CO_2$ pump 35 and the oil pump 26 both have maximum pressure ratings of about 7000 psi. The extractor 10 is maintained at a temperature of about 30–33° C., preferably about 32° C. The extractor pressure is about 350 bars (5076 psi). The ratio of $CO_2$ volume to lubricant volume may be about 50–100 and ideally is about 70–85.

The filter 20 removes solid particles from the solution before it leaves the extractor 10 through an exit 22. The cleaned lubricant and associated $CO_2$ flow through a pressure regulator valve 40 and a throttle valve 42 to an evaporator 44 or evaporator means 44 that has a lower pressure than the mixing vessel 10. Evaporation of $CO_2$ from the solution in the evaporator 44 leaves a residue of clean oil. Four trials of the apparatus described herein resulted in removal of essentially all solid particles from a used lubricant composition from an aluminum rolling mill. Oil recovery rates were acceptable in each case.

The $CO_2$ leaves the reservoir 44 through a pipe 45 and a gas meter 46 before arriving at a $CO_2$ collector or collection vessel 50. The pressure regulator valve 40 is associated with an emergency relief valve 48 connected to the $CO_2$ collector 50.

In a preferred embodiment, all of the cleaned lubricant arriving at the reservoir 44 is reused as a metal rolling lubricant. Similarly, $CO_2$ gas in the collector 50 is pressurized and returned to the $CO_2$ tank 36.

Having described the presently preferred embodiments, it is to be understood that the invention may be otherwise embodied within the spirit and scope of the appended claims.

What is claimed is:

1. A process for separating oil from a lubricant composition contaminated by solid particles, comprising:

(a) mixing liquid or supercritical $CO_2$ with a lubricant composition comprising oil and solid particles, thereby to form a mixture comprising solid particles and a solution comprising oil dissolved in the $CO_2$;

(b) filtering said mixture through a filter medium retaining at least some of said solid particles; and (c) evaporating said $CO_2$ from said solution, thereby to form a residue comprising oil.

2. The process according to claim 1 wherein said lubricant composition further comprises an oil additive selected from the group consisting of alkanolamines, $C_8$–$C_{40}$ mono- or dicarboxylic acids, $C_1$–$C_8$ alkyl esters of $C_8$–$C_{40}$ mono- or dicarboxylic acids and $C_{10}$–$C_{40}$ alcohols.

3. The process according to claim 1 wherein said oil comprises mineral oil or synthetic oil.

4. The process according to claim 1 wherein said solid particles comprise metal particles or metal oxide particles or mixtures thereof.

5. The process according to claim 1 wherein step (a) comprises mixing at least 30 parts by volume $CO_2$ with about one part by volume of the lubricant composition.

6. The process according to claim 1 wherein step (a) comprises mixing about 50–100 parts by volume $CO_2$ with about one part by volume of the lubricant composition.

7. The process according to claim 1 wherein step (b) further comprises maintaining the mixture at a temperature greater than about 20° C. and a pressure greater than about 3000 psi.

8. The process according to claim 1 wherein step (b) includes maintaining the mixture at a pressure greater than about 4000 psi.

9. The process according to claim 1 wherein said filter medium comprises a material selected from the group consisting of paper, diatomaceous earth, sand, textile fibers and wood pulp.

\* \* \* \* \*